(12) United States Patent
Maxwell

(10) Patent No.: US 7,667,949 B2
(45) Date of Patent: Feb. 23, 2010

(54) CAPACITOR HAVING IMPROVED SURFACE BREAKDOWN VOLTAGE PERFORMANCE AND METHOD FOR MARKING SAME

(76) Inventor: John Maxwell, 1120 Pan Ct., Newbury Park, CA (US) 91320

(*) Notice: Subject to any disclaimer, the term of this patent is extended or adjusted under 35 U.S.C. 154(b) by 442 days.

(21) Appl. No.: 11/500,239

(22) Filed: Aug. 5, 2006

(65) Prior Publication Data

US 2008/0030923 A1   Feb. 7, 2008

(51) Int. Cl.
*H01G 4/228* (2006.01)
(52) U.S. Cl. ............ 361/306.3; 361/306.1; 361/307; 361/321.1; 361/321.2; 361/313
(58) Field of Classification Search .......... 361/306.3, 361/306.1, 321.1, 321.2, 303–305, 311–313, 361/307, 309
See application file for complete search history.

(56) References Cited

U.S. PATENT DOCUMENTS

| | | | |
|---|---|---|---|
| 6,381,117 B1 * | 4/2002 | Nakagawa et al. ....... | 361/306.3 |
| 6,542,352 B1 * | 4/2003 | Devoe et al. ............. | 361/321.2 |
| 6,934,145 B2 * | 8/2005 | Hsieh et al. ............. | 361/321.2 |
| 6,940,710 B1 * | 9/2005 | Lee et al. ................ | 361/321.2 |
| 7,050,288 B2 * | 5/2006 | Ahiko et al. ............. | 361/303 |
| 7,054,136 B2 * | 5/2006 | Ritter et al. ............. | 361/309 |
| 7,196,897 B2 * | 3/2007 | Togashi et al. .......... | 361/306.3 |
| 7,262,952 B2 * | 8/2007 | Lee et al. ................ | 361/306.3 |

* cited by examiner

*Primary Examiner*—Nguyen T Ha

(57) ABSTRACT

A capacitor having improved surface breakdown voltage performance and a method for applying laser marking to capacitors which does not reduce capacitor surface breakdown voltage, can be applied using existing laser marking technologies and apparatus, and which results in a mark that is legible and clear, is disclosed. In a first exemplary embodiment a capacitor includes a laser mark which is located near one of the capacitor terminals. The exact location is not critical as long as the mark does not make physical contact with the terminal. Conventional laser marking technologies and apparatus may be used to fix the mark in the new location. In a second embodiment the laser mark is oriented so that a flat portion of the mark is is oriented closest to the adjacent terminal.

16 Claims, 4 Drawing Sheets

CAPACITOR HAVING IMPROVED SURFACE BREAKDOWN VOLTAGE PERFORMANCE AND METHOD FOR MARKING SAME

BACKGROUND OF THE INVENTION

1. Field of the Invention

The present invention relates to high-voltage capacitors and, more particularly, to a capacitor having improved surface breakdown voltage performance using novel method for applying laser or conductive ink marking which increases capacitor surface breakdown voltage.

2. Description of the Prior Art

Capacitors are second only to resistors as electronic circuit elements and are used in virtually every type of electronic circuit. In a typical application, capacitors are used as coupling capacitors in electronic circuits to block a direct current (DC) voltage while allowing alternating current (AC) currents to pass. They are also used as bypass capacitors to prevent the voltage at a circuit node from changing. These two applications do not depend on the exact value of the capacitance. In other applications, capacitors are also used in inductor-capacitor (LC) resonant circuits, in resistor-capacitor (RC) bridges, and as timing elements. In these applications the precise value of the capacitor is usually significant. Capacitors may also be used for accurate charge storage; for example, in sample-and-hold circuits or frequency-to-voltage converters. In these applications, the quality of the dielectric is more important than the capacitance, as long as the latter is stable.

Capacitors are used store charge for discharge through lamps, as in photographic flash lamps or stroboscopes. Capacitors are also used in filtering applications, both in power-supply filters and signal processing applications, often in conjunction with operational amplifiers or other analog circuit components. In power circuits, capacitors may be used to shift phase, as in capacitor-start motors, or for power factor compensation in the case of inductive loads. Finally, capacitors are extremely important in integrated circuits, where they are structured as metal or polysilicon films with silicon dioxide dielectrics on silicon.

A capacitor is typically constructed from two or more conducting electrodes, each of area A and separated by distances d. In most cases, the separations between the conducting electrodes are maintained by sheets of dielectric material of thickness d and having a dielectric constant k. The capacitance of this parallel-plate capacitor (in Farads) is given by $C=ekAn/d$ F, where A is in $m^2$ d is in meters, n is the number of parallel conducting electrodes, and pi=3.1415926. In SI units the constant is $e=4(pi)/c^2=8.854 \times 10^{-12}$ F/m. In units of centimeters, the capacitance is given by $C=kAn/4(pi)d$, where A is now in $cm^2$ and d in cm.

While the net charge on a capacitor under an applied voltage is zero, equal and opposite charges $\pm Q$ are induced on adjacent pairs of electrodes. The charge on the capacitor is thus taken to be $|Q|$, the absolute value of the charge. If one terminal of a capacitor has a polarity marking, say a +, then $Q>0$ means there is a positive charge Q on the corresponding electrode; similarly, $Q<0$ means there is a negative charge on that electrode. Further, given a current $i=dQ/dt$, a positive current flowing into the positively marked terminal will cause the voltage V across the capacitor to increase. The voltage V is the potential difference between the electrodes, and this voltage is positive if the potential of the positively marked plate is higher than the potential of the other.

In an ideal capacitor, the voltage V is proportional to the charge Q, and the constant of proportionality is defined as the capacitance C. More particularly, $Q=CV$, or $C=Q/V$. Most capacitors are close to ideal if the voltage is not excessive and does not vary too rapidly. Conventionally, the units are defined so that a unit charge is one coulomb, and unit voltage is one volt, or one joule/coulomb. The corresponding unit of capacitance is therefore one Farad, or one coulomb per volt. The Farad is an impractically large unit, so the microfarad ($10^{-6}$ Farad) or picofarad ($10^{-12}$ Farad) is commonly used in practice.

As discussed above, most practical capacitors include a dielectric material between the electrodes. The electric field $E=V/d$ between the electrodes passes through the dielectric, terminating on the induced charges charges on the electrodes. Within the dielectric, the charges are elastically bound to their equilibrium positions and can only move slightly in response to the electric field. The positive charges move in the direction of the electric field, and the negative charges move in the opposite direction.

When placed between the parallel electrodes of a capacitor, the dielectric is polarized by the electric field. In order to maintain the electric field at V/d, the extra charge at the surfaces of the dielectric is balanced by equal and opposite charges on the electrodes. At the positive electrode, which had a charge density of E/4(pi) without the dielectric, a charge density P is added resulting in a total charge density of E/4(pi)+P=(E+4(pi)P)/4(pi). The combination E+4(pi)P is the total charge per unit area on the electrode and is analogous to E, the charge per unit area in the absence of the dielectric.

The combination $D=E+4(pi)P$ is called the electric displacement. The flux of D through a closed surface is 4(pi) times the amount of free charge enclosed. The free charge is the total charge less the charge contributed by polarization, and represents that part of the charge that can move, while the polarization charge remains fixed.

A dielectric constant k can be defined in terms of the electric displacement as D=kE. The charge on the capacitor electrodes in the presence of the dielectric is thus $s=D/4(pi)=kE/4(pi)$. Therefore, the total charge Q is increased by the factor k and the capacitance is now $C=kAn/4(pi)d$. Likewise, introducing a uniform dielectric reduces the electrode potentials by a factor 1/k, since the electric fields must be reduced by this factor to keep the same charge Q. Therefore, the effect of adding the dielectric is to increase the capacitance C while keeping area A and separation d constant.

The principal dielectric materials currently in use include mica, Mylar, polystyrene, polypropylene, polycarbonate, polyester, ceramic, aluminum electrolytic, tantalum electrolytic, and gold double layer.

The maximum voltage at which a capacitor can be used is determined by the formation of an electrical discharge in the dielectric. The heat produced by the discharge usually damages the capacitor, except in the case of an air or liquid dielectric, in which little permanent damage may be done. The dielectric strength is the maximum voltage difference that a given thickness of dielectric can sustain without electrical breakdown. Capacitors having improved voltage breakdown performance are in continuous demand in modern electronic circuits and devices, including flat panel and plasma televisions, telecommunications equipment, and military electronics systems.

High-voltage capacitors rated at 2,000 volts or more typically use a floating electrode design to increase effective dielectric thickness and to control electric field gradients within the capacitor. A key parameter of a high-voltage capacitor is the surface breakdown voltage, which defines the maximum voltage at which a capacitor can be used. The surface breakdown voltage is caused by inter-terminal current leakage across the outer surface of the capacitor body, as opposed to discharge between the electrodes and through the dielectric. Thus, the delectric constant of air (k=1.0006) is a key determinant of the surface breakdown voltage.

Most capacitors are marked with the capacitor value and voltage limit. For example, one common scheme uses three digits to indicate a value in picofarad. The first two digits are significant figures, and the final digit is a decimal exponent. Thus, 104 translates to 10 followed by 4 zeros, 100000 picofarads 0.1 microfarads; 472 means 4700 picofarads or 0.0047 microfarads. Other letters and numbers on disc ceramic capacitors are usually the temperature range or value tolerance. For example, 0.1Z Y5S means 0.1 microfarads, tolerance −20%+80%, useful temperature range −30° C. to 85° C., ±22% variation in value over this range. At one time, small capacitors were labeled with colored stripes like the resistor code, and mica capacitors in molded packages had six or three colored dots interpreted the same way; however, there is no uniform series of preferred values for capacitors as there is for resistors.

In addition to capacitor value, modern certified safety capacitors use a laser or conductive ink mark specific to each manufacturer of those safety capacitors to signify that they are safety certified by either the TUV or UL. A typical Multi-Layer Chip Capacitor (MLCC) marking is located on the top center of the device package. This location reduces the creepage, or arc distance, between the device terminals by effectively dividing the inter-terminal distance in half. This occurs because many of the marking inks use metal or carbon particles for color and are therefore slightly electrically conductive. In addition, the shape and size of the mark, along with its orientation, can also have an impact on surface breakdown voltage. Thus, conventional laser marking processes effectively create a slightly conductive island on the dielectric surface in the middle of the device between the terminals, thereby reducing the surface breakdown voltage.

Accordingly, there is a need capacitors having improved surface breakdown voltage performance, and a method for applying laser or conductive ink marking to capacitors which does not degrade or reduce capacitor surface breakdown voltage, is easy to apply using existing laser marking technologies and apparatus, and which results in a mark that is legible and clear.

SUMMARY OF THE INVENTION

The present invention is directed to a capacitor having improved surface breakdown voltage performance and a method for applying laser or conductive ink marking to capacitors which does not reduce capacitor surface breakdown voltage, can be applied using existing laser marking technologies and apparatus, and which results in a mark that is legible and clear.

In a first exemplary embodiment of the present invention, a capacitor includes a laser mark which is located near one of the capacitor terminals. The exact location is not critical as long as the mark does not make physical contact with the terminal. Conventional laser marking technologies and apparatus may be used to fix the mark in the new location.

One advantage of moving the mark near one terminal it that it increases the creepage distance between the mark and the opposite terminal, thereby increasing the surface breakdown voltage. Another advantage is that it places the mark directly above a shield or control electrode, thereby minimizing its presence on electric field gradients compared to when the mark is in the middle of the device.

The orientation of the letter or symbol comprising the laser mark also impacts the surface breakdown voltage. More particularly, if the laser mark is oriented so that its largest portion is close to the terminal, an increase in surface breakdown voltage results.

Thus, in a second embodiment of the present invention, the laser mark is oriented so that a flat portion of the mark is is oriented closest to the adjacent terminal. For example, if the symbol is an asymmetrical letter such as "C", "F", or "L", the long side of the symbol is oriented closest to the terminal. Thus, the registered mark for Johanson Dielectrics, Inc. is a single "J". When the long side of the "J" is closest to the adjacent terminal, the high voltage breakdown voltage performance is better than when the small tip of the "J" is closest to the terminal.

Similarly, if the symbol is a symmetrical letter such as "A", "H", or "S", then either long side of the symbol is oriented closest to the terminal. Although the symbol orientation by itself has less overall effect on the surface breakdown voltage, when used in combination with symbol location it substantially increases the surface breakdown voltage, thereby improving overall capacitor performance.

Further features and advantages of the present invention will be appreciated by a review of the following detailed description of the preferred embodiments taken in conjunction with the following drawings.

BRIEF DESCRIPTION OF THE DRAWINGS

The present invention may be best understood by referring to the following detailed description of the preferred embodiments and the accompanying drawings, wherein like numerals denote like elements and in which.

DETAILED DESCRIPTION OF THE PREFERRED EMBODIMENTS

The following exemplary discussion focuses on a capacitor having improved surface breakdown voltage performance, and a novel method for applying laser marking which increases capacitor surface breakdown voltage.

Figure 1:
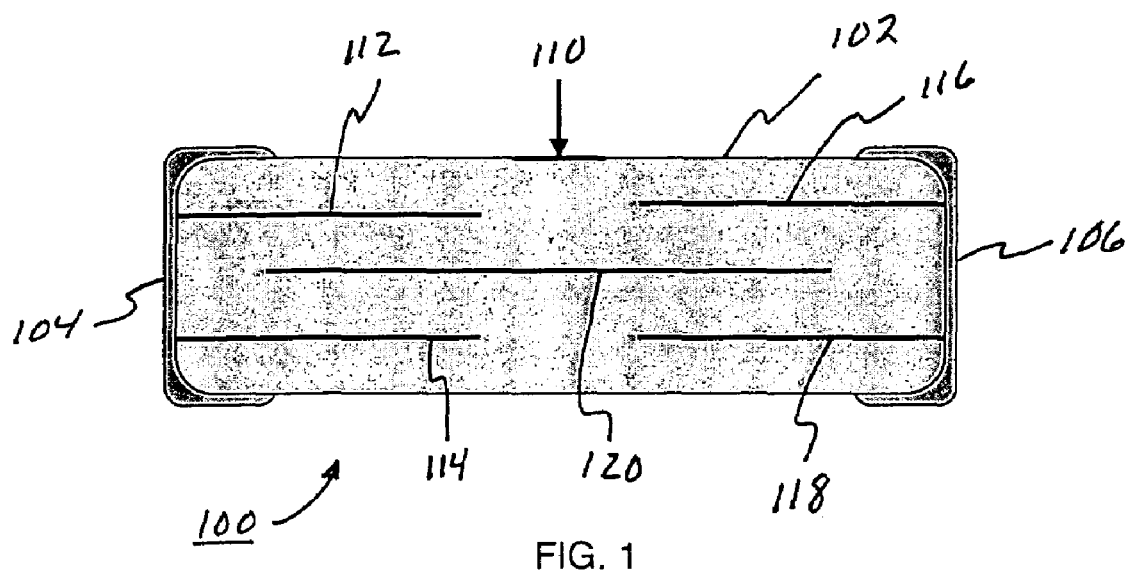
FIG. 1 shows the internal structure and marking of a prior art high-voltage capacitor 100, where a laser mark 110 is positioned equidistant between terminals 104 and 106 of capacitor 100.

Referring to FIG. 1, the internal structure and marking of a prior art high-voltage capacitor 100 is shown. Capacitor 100 is comprised of a ceramic body or dielectric 102, terminals 104 and 106 connected to opposite ends of dielectric 102, and control electrodes 112-114 and 116-118 positioned within dielectric 102 and connected to terminals 104 and 106, respectively. Capacitor 100 further comprises a floating electrode 120 positioned within dielectric 102 between control electrodes 112-114 and 116-118. A laser mark 110 is positioned on the top outer surface of dielectric 102, equidistant between terminals 104 and 106.

As will be apparent to those skilled in the art, the inclusion of the laser mark 110 equidistant between terminals 104 and 106 can reduce the surface breakdown voltage. Many of the inks used in the marking of capacitors contain carbon or metal particles for color and are thus slightly conductive. Laser mark 110 therefore forms a conductive island midway between the terminals 104 and 106, effectively reducing the arc distance by one half. This reduction in distance reduces the surface breakdown voltage and degrades capacitor performance.

A related issue concerns the interaction between control electrodes 112-118 and laser mark 110. The electric field at the edges of control electrodes 112-118 can become distorted by laser mark 110, further reducing the breakdown voltage and capacitor performance.

Figure 2:
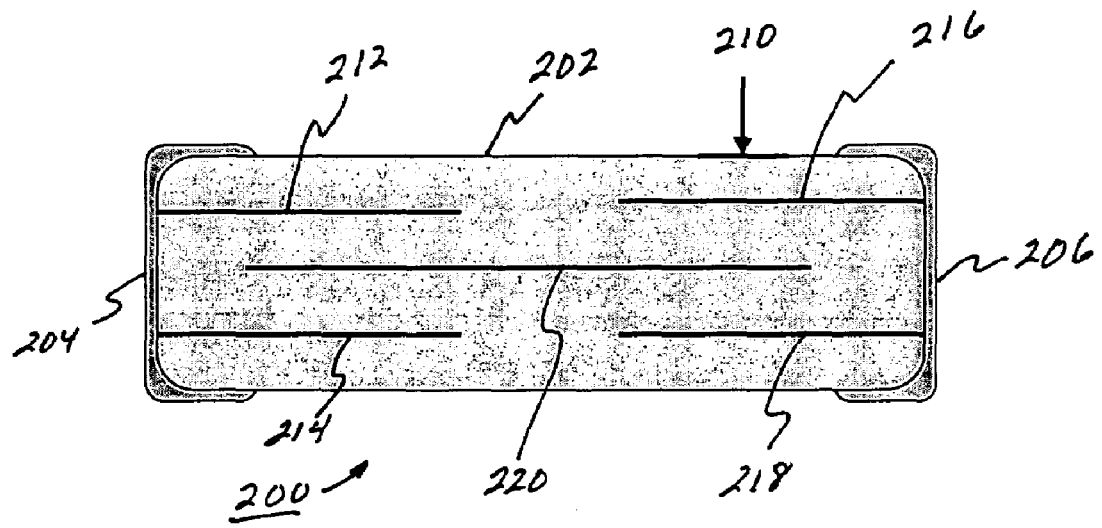
FIG. 2 shows the internal structure and marking of an exemplary high-voltage capacitor 200, where a laser mark 210 of positioned near terminal 206 of capacitor 200, in accordance with a first embodiment of the present invention.

Continuing with FIG. 2, the internal structure and marking of an exemplary high-voltage capacitor 200, where a laser mark 210 os positioned near one of the terminals of capacitor 200, is now shown and discussed. Capacitor 200 is comprised of a ceramic body or dielectric 202, terminals 204 and 206 connected to opposite ends of dielectric 202, and control electrodes 212-214 and 216-218 positioned within dielectric 202 and connected to terminals 204 and 206, respectively. Capacitor 200 further comprises a floating electrode 220 positioned within dielectric 202 between control electrodes 212-214 and 216-218. A laser mark 210 is positioned on the top outer surface of dielectric 202, adjacent to terminal 206.

The inclusion of the laser mark 210 adjacent to terminal 206 places the conductive island a distance away from terminal 204. The distance from terminal 204, while slightly less than the distance between terminals 204 and 206, is greater than one half the inter-terminal distance. Thus, the resulting surface breakdown voltage will be larger than that of capacitor 100 and comparable to that of an unmarked capacitor. In addition, there is little or no interaction between control electrodes 216-218 and laser mark 210. and any interaction that might occur has little or no effect on the capacitor surface breakdown voltage or performance.

Figure 3:
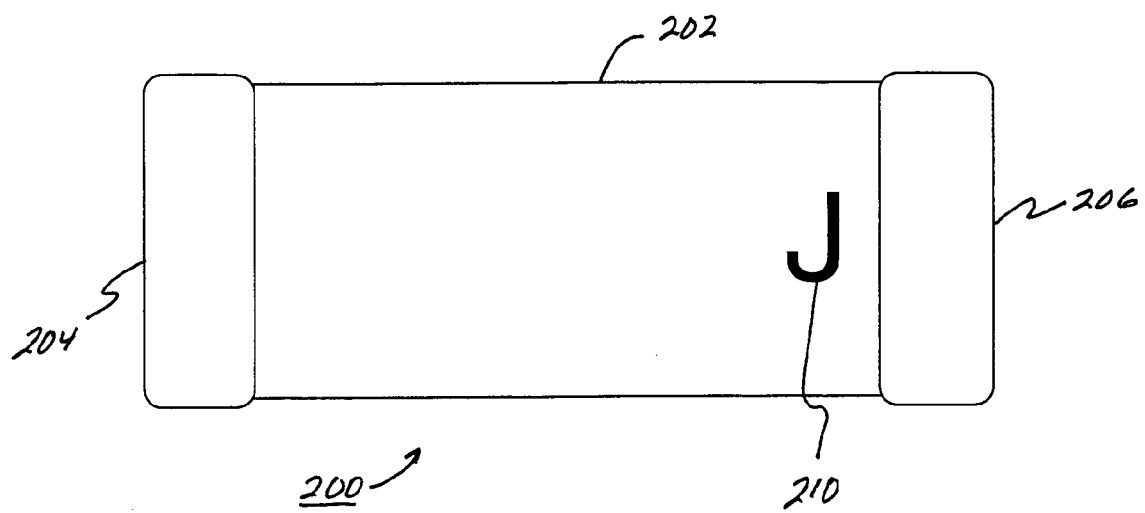
FIG. 3 shows a preferred orientation of laser mark 210 positioned near terminal 206 of capacitor 200, in accordance with a second embodiment the present invention.

Referring now to FIG. 3, a preferred orientation of laser mark 210 positioned near terminal 206 of capacitor 200, is shown. Laser mark 210, represented by asymmetric letter "J", is shown adjacent to terminal 206 with long side of the "J" closest to the terminal. This orientation exposes a larger area of the letter to termnal 206 and a smaller area to terminal 204, thus slightly increasing the effective distance between laser mark 210 and terminal 204. This slight increase in distance further increases the surface breakdown voltage, along with the corresponding capacitor performance.

It should be apparent to those skilled in the art that the effects of symbol positioning and orientation apply to any letter or symbol used to mark capacitor 200. In order to maximize capacitor performance, the laser mark should be placed adjacent to one of the capacitor terminals and oriented so that the longest side of the symbol faces the adjacent terminal.

Figure 4:
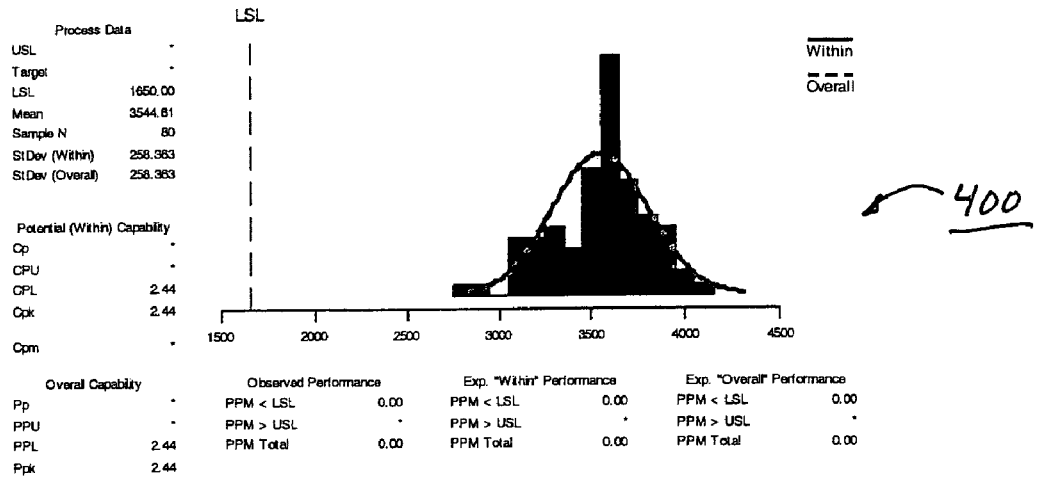
FIG. 4 is an exemplary histogram of the typical surface breakdown voltage for an unmarked high-voltage capacitor.

FIG. 4 shows an exemplary histogram of the typical surface breakdown voltage for an unmarked high-voltage capacitor. In this case, the surface breakdown voltage has a mean value of 3,544 volts and a standard deviation of 258 volts. This represents the optimal performance of a capacitor having a maximum distance between its terminals.

Figure 5:
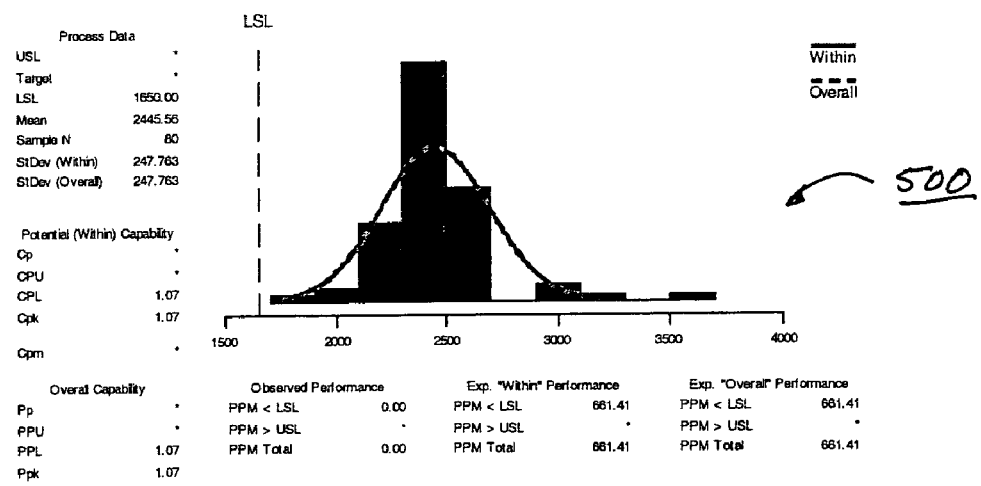
FIG. 5 is an exemplary histogram of the typical surface breakdown voltage for high-voltage capacitor 100 having a conventional laser mark 110 positioned equidistant between terminals 104 and 106.

Continuing with FIG. 5, an exemplary histogram of the typical surface breakdown voltage for high-voltage capacitor 100 having a conventional laser mark 110, is now shown. Here, the surface breakdown voltage has been reduced by over 1,000 volts as compared to the unmarked capacitor of FIG. 4. More particularly, the mean value of the surface breakdown voltage is 2,445 volts and the standard deviation is 247 volts. This downward shifting of the surface breakdown voltage has a clear and measurable effect on capacitor performance.

Figure 6:
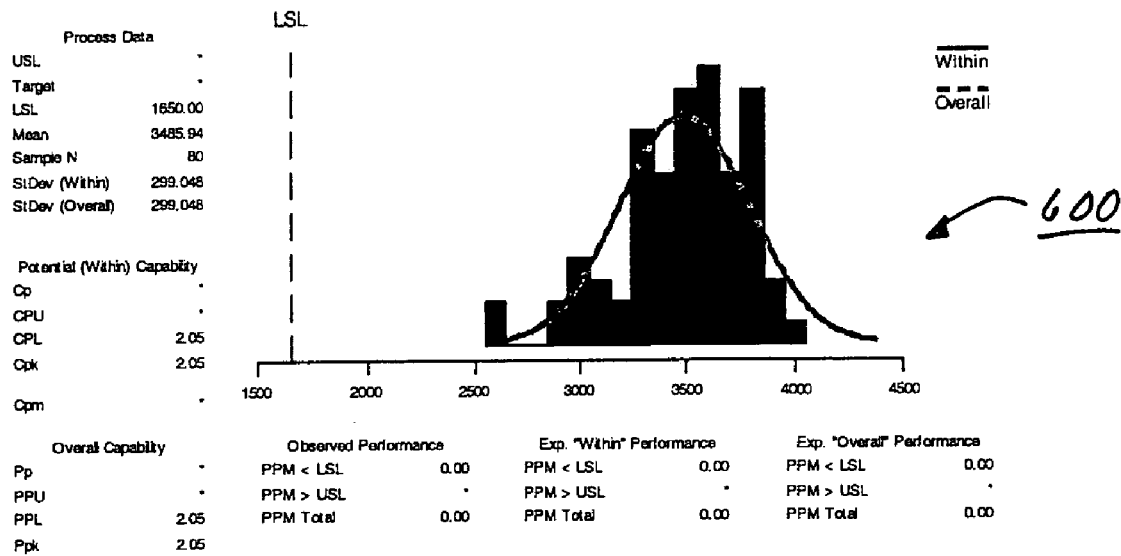
FIG. 6 is an exemplary histogram of the typical surface breakdown voltage for high-voltage capacitor 200 having a laser mark 210 positioned near terminal 206, in accordance with the present invention.

In FIG. 6, an exemplary histogram of the typical surface breakdown voltage for high-voltage capacitor 200 having a laser mark 210 positioned near terminal 206, is discussed and compared with the results of FIG. 5. With the laser mark positioned adjacent to terminal 206, the mean surface breakdown voltage has increased to 3,485 volts with a standard deviation of 299 volts. This mean value is comparable with that of the unmark capacitor and represents a substantial improvement over that of capacitor 100. Accordingly, the expected performance of capacitor 200 will be measurably better than that of capacitor 100.

The foregoing description includes what are at present considered to be preferred embodiments of the invention. However, it will be readily apparent to those skilled in the art that various changes and modifications may be made to the embodiments without departing from the spirit and scope of the invention. For example, the size, shape or type of the capacitor body may be changed without affecting the additional improvement in surface breakdown voltage provided by the present invention. Additionally, the numbers and positioning of control or floating electrodes may be changed. Similarly, the specific symbol or symbols using to mark the capacitor may be changed or substituted. Accordingly, it is intended that such changes and modifications fall within the spirit and scope of the invention, and that the invention be limited only by the following claims.

What is claimed is:

1. A capacitor, comprising:

An insulating body;

a pair of terminals attached to opposite ends of said insulating body, said pair of terminals electrically connected to a plurality of electrodes positioned within said insulating body, such that said insulating body provides electrical separation between said pair of terminals and between said plurality of electrodes; and a mark afixed to an external surface of said insulating body, said mark positioned a first predetermined distance away from one of said pair of terminals and said mark positioned a second predetermined distance away from other of said pair of terminals, said first predetermined distance less than said second predetermined distance, whereby said mark is closer to one of said pair of terminals.

2. The capacitor of claim 1, wherein said insulating body is further comprised of a ceramic material.

3. The capacitor of claim 1, wherein said insulating body is further comprised of a dielectric material.

4. The capacitor of claim 1, wherein said mark comprises an alphanumeric character.

5. The capacitor of claim 4, wherein said mark is comprised of a conducting material.

6. The capacitor of claim 4, wherein said alphanumeric character is comprised of at least one long side, and one of said at least one long sides oriented adjacent to closest of said pair of terminals.

7. A capacitor having a dielectric body and a pair of conducting terminals attached to opposite ends of said dielectric body, said capacitor comprising:

a mark afixed to an external surface of said dielectric body, said mark positioned a first predetermined distance away from one of said pair of conducting terminals and said mark positioned a second predetermined distance away from other of said pair of conducting terminals, said first predetermined distance less than said second predetermined distance, whereby said mark is closer to one of said pair of conducting terminals.

8. The capacitor of claim 7, wherein said mark comprises an alphanumeric character.

9. The capacitor of claim 7, wherein said mark is comprised of a conducting material.

10. The capacitor of claim 7, wherein said mark is comprised has at least one long side, and wherein said mark is oriented so that one of said at least one long sides is adjacent a closer of said pair of conducting terminals.

11. In a capacitor comprising a dielectric body and a pair of terminals attached to opposite ends of said dielectric body, a method for marking said capacitor comprising the step of:

fixing a mark to an external surface of said dielectric body, said mark positioned a first predetermined distance away from one of said pair of terminals and said mark positioned a second predetermined distance away from other of said pair of terminals, said first predetermined distance less than said second predetermined distance, whereby said mark is closer to one of said pair of terminals.

12. The method of of claim 11, wherein said step for fixing said mark is comprises fixing an alphanumeric character to said external surface of said dielectric body.

13. The method of claim 11, wherein said mark is comprised has at least one long side, and wherein said method further comprises the step of orienting said mark so that one of said at least one long sides is adjacent a closer of said pair of conducting terminals.

14. The method of claim 11, wherein said step of positioning said mark further comprises the step of positioning said mark using a laser marking system.

15. A method for marking a capacitor with a mark, said capacitor comprising a body and a pair of terminals attached to opposite ends of said body, and said mark having at least one long side, said method comprising the steps of:

positioning said mark adjacent to one of said pair of terminals and away from other of said pair of terminals; and positioning said mark using a laser marking system.

16. A method for marking a capacitor with a mark, said capacitor comprising a body and a pair of terminals attached to opposite ends of said body, and said mark having at least one long side, said method comprising the steps of:

positioning said mark adjacent to one of said pair of terminals and away from other of said pair of terminals; and orienting said mark so that one of said at least one long sides is adjacent a closer of said pair of conducting terminals.

* * * * *